(No Model.) 9 Sheets—Sheet 1.

R. MORGENEIER & J. P. BERGERON.
DUPLICATING MACHINE.

No. 456,423. Patented July 21, 1891.

Fig. 1.

WITNESSES:

INVENTOR:
R. Morgeneier
J. P. Bergeron
BY Munn & Co.
ATTORNEYS.

(No Model.) 9 Sheets—Sheet 3.

R. MORGENEIER & J. P. BERGERON.
DUPLICATING MACHINE.

No. 456,423. Patented July 21, 1891.

WITNESSES:

INVENTOR:
R. Morgeneier
BY J. P. Bergeron
Munn & Co.
ATTORNEYS.

(No Model.) 9 Sheets—Sheet 4.

R. MORGENEIER & J. P. BERGERON.
DUPLICATING MACHINE.

No. 456,423. Patented July 21, 1891.

WITNESSES:

INVENTOR:
R. Morgeneier
J. P. Bergeron
BY Munn & Co.
ATTORNEYS.

(No Model.) 9 Sheets—Sheet 5.

R. MORGENEIER & J. P. BERGERON.
DUPLICATING MACHINE.

No. 456,423. Patented July 21, 1891.

Fig. 7.

WITNESSES:
Donn Twitchell
C. Sedgwick

INVENTOR:
R. Morgeneier
J. P. Bergeron
BY Munn & Co.
ATTORNEYS.

(No Model.) 9 Sheets—Sheet 7.

R. MORGENEIER & J. P. BERGERON.
DUPLICATING MACHINE.

No. 456,423. Patented July 21, 1891.

WITNESSES:
Donn Twitchell
C. Sedgwick

INVENTOR:
R. Morgeneier
J. P. Bergeron
BY Munn & Co.
ATTORNEYS.

UNITED STATES PATENT OFFICE.

ROBERT MORGENEIER AND JASMIN PIERRE BERGERON, OF WINONA, MINNESOTA, ASSIGNORS OF ONE-THIRD TO W. J. LANDON AND O. N. ROBERTS, BOTH OF SAME PLACE.

DUPLICATING-MACHINE.

SPECIFICATION forming part of Letters Patent No. 456,423, dated July 21, 1891.

Application filed October 21, 1889. Serial No. 327,727. (No model.)

*To all whom it may concern:*

Be it known that we, ROBERT MORGENEIER and JASMIN PIERRE BERGERON, both of Winona, in the county of Winona and State of Minnesota, have invented a new and Improved Duplicating-Machine, of which the following is a full, clear, and exact description.

The object of this invention is to provide a machine by means of which the most elaborate and delicate carvings and sculptures, as well as natural patterns or casts therefrom, may be reproduced in unlimited number and at an enormous reduction in time and cost as compared to hand-work and all methods heretofore employed, the machine being so organized that the patterns or models, which may be composed of any proper material, will sustain no damage during the process of duplication.

To the end above named the invention consists, essentially, of a reciprocating standard, a series of guide-fingers, a tripping mechanism arranged in connection therewith, a series of drills or bits arranged in connection with the guide-fingers, a means for reciprocating the standard, a means for revolving the drills or bits, holders for the pattern and for the material in which the reproduction is to be produced, and a means for imparting a corresponding movement to the pattern and the said material, such movements being practically universal.

Reference is to be had to the accompanying drawings, forming a part of this specification, in which similar figures and letters of reference indicate corresponding parts in all the views.

In the drawings, 100 represents the main frame of the machine, which serves as the support for the several shafts, tables, and auxiliary frames necessarily employed in the construction of our machine. The main shaft of the machine is shown at 10, and at one end of this shaft is mounted a fast pulley 11 and a loose pulley 12, a driving-belt 13 being arranged in connection with said pulleys. In organizing the machine as at present contemplated the pulleys 11 and 12 would be eighteen inches in diameter.

In proper position upon the shaft 10 there is mounted a six-inch gear 14, which engages a corresponding gear 15, carried by a shaft 16, and in connection with this gear 15 we arrange a corresponding bevel-gear 17, which engages a twenty-four-inch bevel-gear 19, mounted upon a transverse shaft and made integral with or rigidly connected to a corresponding surface gear 20, which engages a twelve-inch gear 21, carried by a transverse shaft 22. The shaft 22 also carries a gear 23, such gear being twenty-four inches in diameter, and this gear 23 engages a six-inch gear 24, to the shaft of which there is secured a crank-disk 25. To the wrist-pin 26 of the crank-disk 25 we connect a pitman or connecting-rod 27, which extends forward and is pivotally connected to a bed 28, mounted to slide in proper ways formed in the frame 100, and this bed 28 carries an upwardly-extending standard 29, the purpose of which will be hereinafter explained.

From the construction above described it will be seen that if the shaft 10 be driven at the rate of sixty revolutions per minute the shaft 16 will be correspondingly moved, while the shaft which carries the gear 20 will be advanced fifteen times per minute, the shaft which carries the gears 21 and 23 will be advanced thirty times per minute, and the crank-disk one hundred and twenty times per minute, thus bringing about one hundred and twenty equal and continuous reciprocations of the bed 28, and consequently of the standard 29.

The parts above described constitute what we term the "first part" of the train, the object of this first part being to impart a continuous and equal reciprocating motion to the bed 28 and the standard 29.

The second part of the train is driven from the gear 20, which gear engages a six-inch surface gear 30, that is keyed upon a shaft 31 and made integral with or rigidly connected to a corresponding bevel-gear 32, which engages a similar bevel-gear 33, carried by a longitudinal shaft 34, upon which there is keyed a six-inch gear 35, that engages a twenty-four-inch gear 36, keyed to a shaft 37, which carries a twelve-inch bevel-gear 38, that engages a corresponding gear 39, loosely mounted on a transverse shaft 40, the connection being such that the gear 39 is revolved thirty times per minute. This gear 39 carries a disk 41, from the peripheral face of which there extends a number of detachable projections 42, as many of these projections being employed as may be deemed advisable, the number depending upon the character of the work that is to be done.

Figure 8:
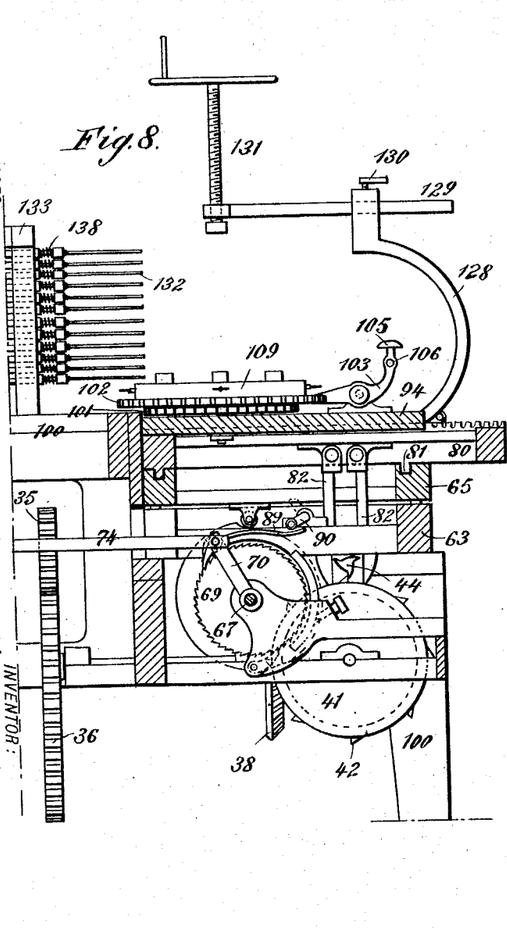
Fig. 8 is an enlarged longitudinal sectional view on line 8 8 of Fig. 3, a portion only of the machine being shown and the upper table being represented as it appears when the chucks are in position.

Above the shaft 40 there is mounted a threaded shaft 43, having a cam-head 44, the form of such cam-head being best shown in Fig. 8, and the arrangement being such that as the disk 41 revolves its projections 42 will bear upon the cam-head 44, and the threaded shaft 43 will be advanced step by step, one hundred and twenty intermittent motions being imparted to such shaft if the disk 41 be provided with eight projections 42 and the speed at which the disk is rotated be fifteen times per minute. The object of the intermittent rotary motions imparted to the screw-shaft 43 will be hereinafter explained.

The third deflection of the power transmitted to the shaft 10, as heretofore described, is brought about by an eighteen-inch pulley 50, that is keyed to the inner end of the said shaft 10. Upon this pulley there is mounted a belt 51, which runs upon a six-inch pulley 52, carried by a shaft 53, which also carries an eighteen-inch pulley 54, upon which a belt 55 runs, said belt running upon a six-inch pulley 56, mounted upon a shaft 57, which also carries a pulley 58.

Upon the pulley 58 we mount a long driving-belt 59, that extends upward to a guiding-pulley 60, mounted in bearings carried by an upwardly-extending frame 61. In its upward passage one length of the belt 59 bears against the peripheral faces of a series of spindles 62, such spindles being one inch in diameter and the several constructions being such that when the shaft 10 is driven at the rate heretofore named the spindles will be driven at the rate of nine thousand seven hundred and twenty revolutions a minute.

At the right-hand end of the frame 100 we mount a frame 63, in the corners of which frame there are formed apertures 64, and upon this frame 63 we place a frame or table 65, provided with downwardly-extending projections 66, such projections being so located as to fit snugly within the apertures 64, whereby we provide for a slight vertical movement of the frame or table 65, but prevent any lateral movement thereof. To bring about this vertical movement of the frame or table 65 we provide a shaft 67, which carries two cams 68, such cams being formed with a spiral bearing-face, which gradually recedes from the cam-axis from the point $a$ to the point $b$, whereby there is formed an abrupt shoulder $c$.

Figure 10:
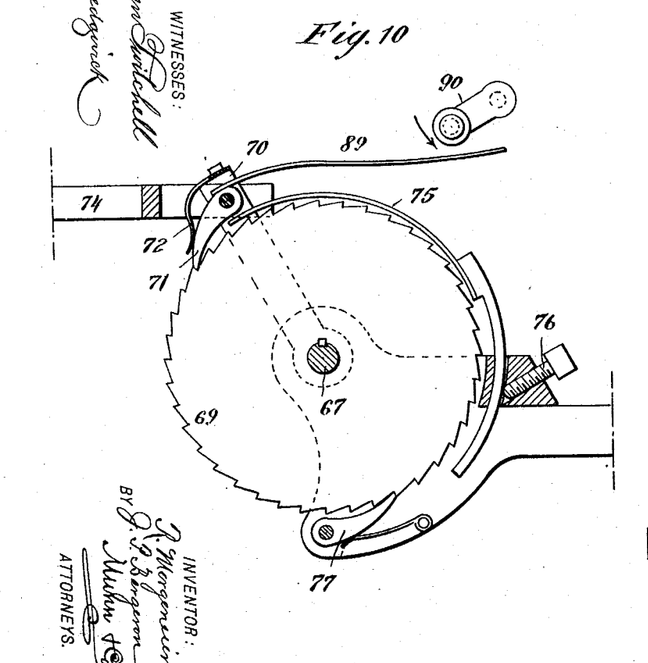
Fig. 10 is a greatly-enlarged view of the ratchet and its connections, parts being broken away.

Upon the shaft 67 we rigidly mount a ratchet 69 and loosely mount in connection therewith an arm or arms 70, which carry a pawl 71, normally held in contact with the ratchet-teeth by a spring 72. The arm or arms 70 we connect with a downwardly-extending arm 73, that is carried by the reciprocating bed 28, this connection being established through the medium of a rod 74. The length of the stroke of the parts controlling the pawl-carrying arm or arms 70 is such that several of the ratchet-teeth would be passed over at each reciprocation; but in order that the number of teeth actually engaged may be regulated to suit the requirements of the particular class of work that is being done we provide a shield 75, which extends forward over the ratchet-teeth, such shield being adjustable and being held to place by a set binding-screw 76, and to prevent any retrograde movement of the shaft 67 we provide a spring-pressed retaining-pawl 77, arranged as clearly shown in Fig. 10.

Figure 9:
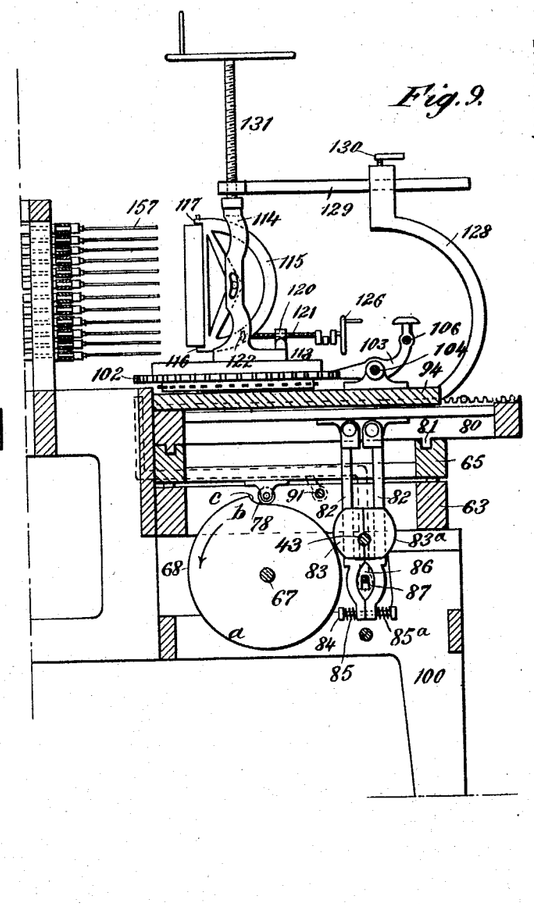
Fig. 9 is a similar view on line 9 9 of Fig. 3, the panel-holder being shown in position and parts being broken away, a portion only of the machine being represented in this figure.

From the construction above described it will be seen that at each reciprocation of the bed 28 the shaft 67 will be advanced in the direction of the arrow shown in connection therewith in Fig. 9, and as the shaft is so advanced the frame or table 65 will be slightly raised, this raising being brought about step by step.

To prevent all undue friction, we provide the table 65 with anti-friction rolls or wheels 78, which bear upon the peripheral faces of the cams 68. Above the table or frame 65 we mount a frame or table 80, formed with downwardly-extending longitudinal flanges 81, such flanges riding in grooves formed for their reception in the upper face of the table 65. When the machine is in operation, the table 80 has a transverse movement, and to impart this movement to the table we pivotally connect arms 82 to the under side thereof, such arms extending downward through grooves or apertures formed in complementary nut-sections 83 and 83ª, such nut-sections when in the position in which they are shown in Fig. 9 engaging the thread of the shaft 43.

In order that the nut-sections may be normally held in the position in which they are shown in the figure last above referred to, we aperture the lower ends of the arms 82, and through the apertures so formed we pass a double-headed rod 84, upon which there are coiled springs 85 and 85ª, such springs acting to hold the lower ends of the arms together, as will be readily understood. Just above the lower ends of the arms 82 we arrange a cam 86, which is held to turn within a space formed by bending the arms outward and then inward at the point where the cam is located. This cam 86 is centrally slotted, and through the slot so formed we pass a squared or irregularly-formed rod 87, to the outer end of which rod there is secured a lever arm or handle 88, the arrangement being such that by throwing the lever arm or handle downward the cam will be turned and the nut-sections thrown from engagement with the thread of the shaft 43, thus checking all forward movement of the frame or table 80, such forward movement being brought about by the intermittent forward movements imparted to the shaft 43 by the projections 42 of the disk 41, as heretofore described; but at the time the forward movement of the frame 80 is checked it is desirable that the upward movement of the frame or table 65 be also checked, and to this end we provide the pawl 71 with an arm 89, which extends to the rear over the shield 75. Above this arm 89 we mount a lever 90, which is rigidly connected to a shaft 91, such shaft at its opposite end carrying a lever 92, that extends into the path of the lever 88, so that when the lever 88 is thrown downward to move the nut-sections 83 and 83ª from engagement with the thread of the shaft 43 the lever 92 will be borne upon and the shaft 91 turned in a direction to carry its lever 90 in the direction of the arrow shown in connection therewith in Fig. 10, and as the lever 90 is so moved the pawl projection 89 will be borne upon and the pawl raised to a position such that in reciprocating it will not engage the teeth of the ratchet 69, and hence all forward movement of the shaft 67 will be checked.

Figure 5:
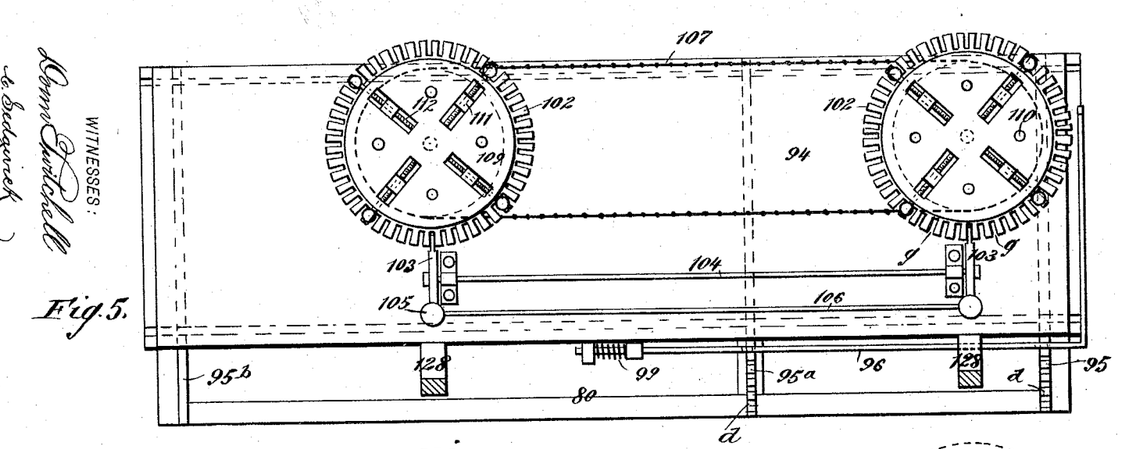
Fig. 5 is an enlarged detail view of the clutch-carrying table and its movable supporting-tables, the panel and panel-pattern holder standards being shown in section.

Above the table or frame 80 there is arranged a table 94, this table being guided by upwardly-extending flanges 95, 95ª, and 95ᵇ, formed upon the table 80, the arrangement being such that the table 94 may be moved longitudinally upon the frame 80; but in order that the table 94 may be held in such position as may be required we prefer to form the flanges 95 and 95ª with teeth $d$ and to provide the table 94 with a rod or bar 96, having downwardly-extending projections 97, adapted to enter the spaces between the teeth $d$, a spring 99 acting to normally hold the rod 96 in the position in which it is shown in Fig. 5—that is, in a position such that its projections 97 will enter the spaces between the teeth $d$ and hold the table 94 in the desired position.

In proper location upon the table 94 we mount chain-wheels 101, that carry disks 102, the peripheral edges of such disks being formed with notches $g$, that are entered by catches 103, such catches being rigidly connected to a bar 104, mounted in bearings secured to the table 94. The catches 103 are each provided with handles 105, the arrangement being such that when the handle of one catch is depressed the other catch-handle will also be depressed and the catches will be thrown from engagement with the disks. To strengthen the connection between the catches we prefer to connect the handles by means of a rod 106. In connection with the chain-wheels 101 we arrange a chain 107, so that when one wheel is moved a corresponding motion will be imparted to the other wheel.

The disks 102 carry chucks 109, these chucks being of any proper construction and being held to the disks in any manner desired; but in practice we prefer to provide the disks with upwardly-extending projections 110, which enter correspondingly-arranged apertures formed in the chuck-plates, and we prefer to provide the chucks with clamping-blocks 111, that are carried by screws 112; but, as before stated, we desire it to be distinctly understood that any form of chuck might be employed.

Figure 6:
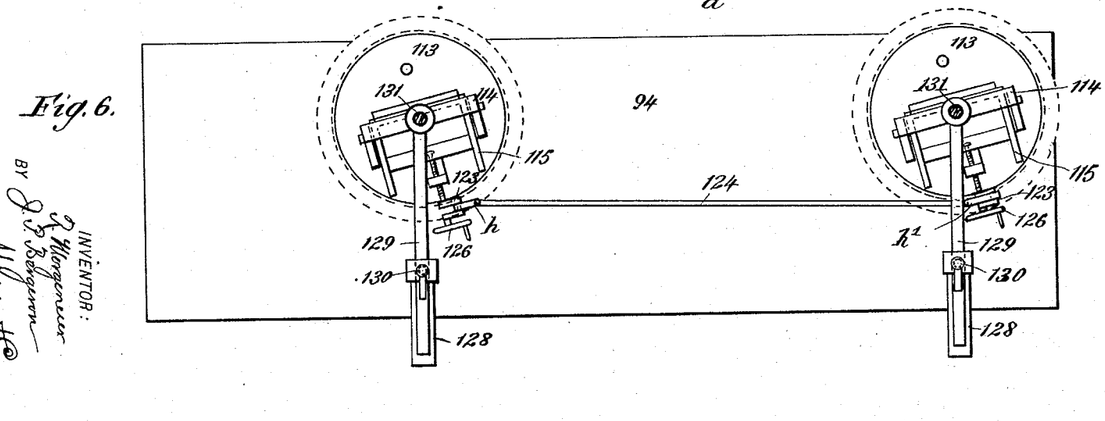
Fig. 6 is a detail view of the table as it appears when the panel and panel-pattern holders are substituted for the chucks, the binding-screws being shown in section.
Figure 7:
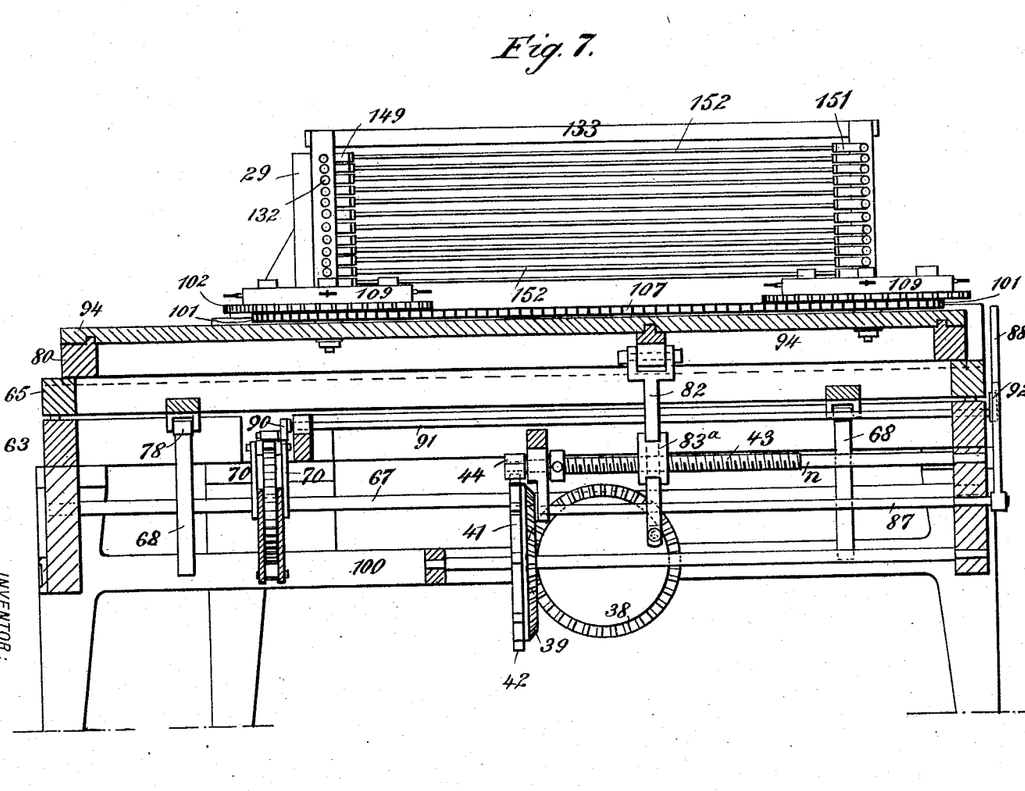
Fig. 7 is an enlarged cross-sectional view on line 7 7 of Fig. 2.

In operation the pattern is held by the chuck upon the right in Fig. 5, while the material to be operated upon is held by the chuck upon the left in said figure. In certain cases—as, for instance, in the reproduction of panels—the chucks would be discarded, and in their place we would employ panel and panel-pattern holders, such holders consisting of a bed-plate 113, having a vertical frame 114, between the standards of which frame 114 there is mounted a swinging frame 115, this frame having a serrated lower flange 116 and an upper flange 117, in which there is a number of set or binding screws 118. The frame 115 carries a central horizontal shaft, which shaft rides in curved slots 119, that are formed in the standards of the frame 114. The bed-plate 113 has an upwardly-extending apertured and threaded lug 120, through which there is passed an adjusting-screw 121, the head 122 of this screw being a double concave and riding in a properly-shaped aperture formed in the lower cross-bar of the frame 115. The screws 121 are formed with cranks 123, or one screw might be formed with a crank and the other with an eccentric, as shown in Fig. 6, and these cranks or the crank and the eccentric are quartered and connected by a pitman or connecting-rod 124, that is jointed at $h$ and $h'$, the arrangement being such that when either of the screws is turned a corresponding motion will be imparted to the other screw. It will be seen that by turning the screws the panel and its pattern carried by the frame 115 may be simultaneously tilted forward or backward, as the exigencies of the case require. To bring about this turning of the screws 121, we provide such screws with crank arms or handles 126.

Figure 11:
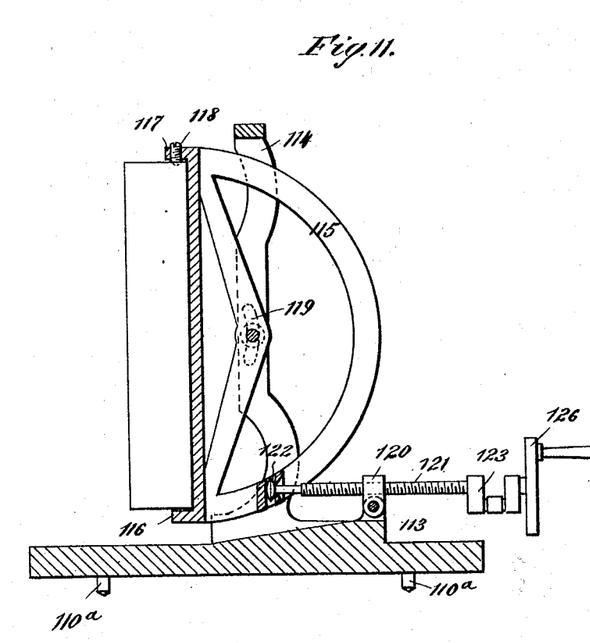
Fig. 11 is a similar view in central vertical section of the panel-pattern holder.

In describing the connection between the chuck-plates and the disks 102 we stated that the disks were provided with upwardly-extending pins which entered apertures formed in the chuck-plates. In Fig. 11 we show the base-plate of the pattern-carrying frame as being provided with downwardly-extending projections or pins 110$^a$, which enter corresponding apertures formed in the disks 102, this construction being regarded as the equivalent of the one described in connection with the chucks, it being of course understood that in the building of the machine one of these constructions, to the exclusion of the other, would be employed.

When the machine is in operation, it will be understood that the frames 114 should be rigidly held, and to this end we provide standards 128, which extend upward from the table 94, the upper ends of these standards being slotted to receive forwardly-extending arms 129, that are held in such position as may be desired by set or binding screws 130. The arms 129 carry clamping screws 131, which may be turned down to bear upon the frame 114, as represented in Fig. 9. These binding-screws would also be employed when casts or models are used in connection with the chucks 109.

Figure 15:
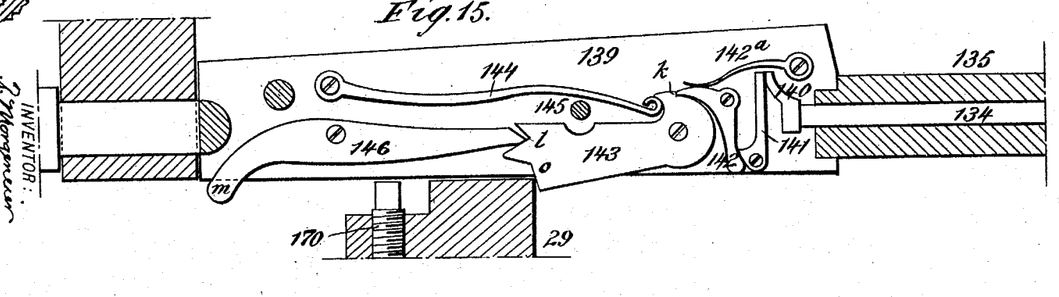
Fig. 15 is an enlarged detail view of one of the guide-finger-tripping mechanisms and reciprocating standards, parts being shown in section.

On the right-hand side of the machine and just within the line of travel of the standard 29 we mount a series of guide-fingers 132, the cases in which such fingers are held sliding in boxes mounted in an auxiliary frame 133. The construction of the guide-fingers is best shown in Figs. 14 and 15, the inner ends of the fingers being threaded to engage the head of a sliding stem 134, which is held within a case 135, which case in turn slides in rigid boxes held in frame 133, (shown in Fig. 12,) the stem 134 being formed with a recess 136, that is entered by a limit-screw 137, carried by the case 135. A spring 138 acts to extend the finger in the relative position in which the parts are shown in Fig. 14—that is, to hold the finger extended. The function of the guide-finger is to indicate, in conjunction with the pattern when such guide-finger touches the pattern, the relative or corresponding point at which the particular drill or bit connected therewith shall cease to cut into the material operated on. It is the governor of the reciprocating motion of the carrying-frames in so far as it controls the distance of the advancement of its carrying-frame during each reciprocating motion. The distance of the advancement of course governs the depth of cutting, as there can be no contact of the drill or bit with the material except during the advancement of the standard and carrying-frame and while the frame is locked to the standard. To the inner end of the case 135 we connect a housing 139, and to the inner end of the stem 134 we secure a toe 140, which rides within the housing and bears upon a cam-headed lever 141, the cam-face of said lever bearing upon what might be called a "trigger" 142, which trigger by a spring 142$^a$ is normally held in engagement with a shoulder $k$, formed upon a pawl 143, said pawl being in turn borne upon by a spring 144, which normally acts to hold the pawl against a stop or limit pin 145. To the rear of the pawl 143 we mount a locking-lever 146, the forward point of which enters a recess $l$, formed in the rear face of the pawl, while the rear end $m$ of the lever 146 extends outward from the housing 139. To the rear of the housing 139 we connect a stem 147, which slides in boxes formed in the uprights of the frame 133, the parts being normally held in the position in which they are shown in full lines in Fig. 12 by a spiral spring 148, that is arranged as clearly shown in the figure just referred to. The stem 14 is pinioned in a block or frame 149, and to the rear end of this block there is connected a laterally-extending rod 150, the left-hand end of the rod being connected to a frame 151. To the forward end of the block or frame 149 we secure a rod 152, which extends diagonally forward to be secured to the forward end of the frame-piece 151.

The stem 147, piece 149, rod 150, piece 151, and rod 152 constitute a rigid frame, hereinafter to be designated as "carrying-frame." On frame-piece 151, forming part of said carrying-frame, are two projecting lugs provided with boxes. Through one of said lugs passes the spindle 153 and through the other the stem 156, thus providing points of support for said carrying-frame. To the rear the spindle 153 terminates in a friction-spindle 62, while at its front it carries a tube or case 154, which is longitudinally slotted at 155, and within the case 155 we mount the stem 156, to the forward end of which there is secured a drill or bit 157, the end of the stem being provided with a head 158, which is internally threaded in order that it may be engaged by a threaded projection formed at the butt-end of the drill or bit.

Just to the rear of the head 158 the stem 156 carries a collar 159, the forward lug of the frame-piece 151 resting between the head and collar, the stem passing through this forward section of the frame. To the inner end of the stem 156 we secure a stud 160, which carries an anti-friction roll 161, the anti-friction roll riding in the slot 155. From the construction just described it will be seen that if the spindle composed of the roll 62, spindle 153, and case 154 be revolved a rotary motion will be imparted to the drill or bit 157.

As stated in the fore part of this specification, the spindle-rolls 62 are driven by a belt 59, which passes upward over a pulley 60, mounted in bearings at the upper end of a frame 61. With such an arrangement as the one described it is necessary to provide a means for holding the belt 59 in frictional contact with the spindles, and to this end we mount a series of tightening-rolls 163, that are carried by standards 164, such standards being connected to the standards of the frame 61 by adjusting-screws 165, the arrangement being such that by turning the screws forward or backward a proper degree of friction between the belt and the spindles may be secured.

Figure 12:
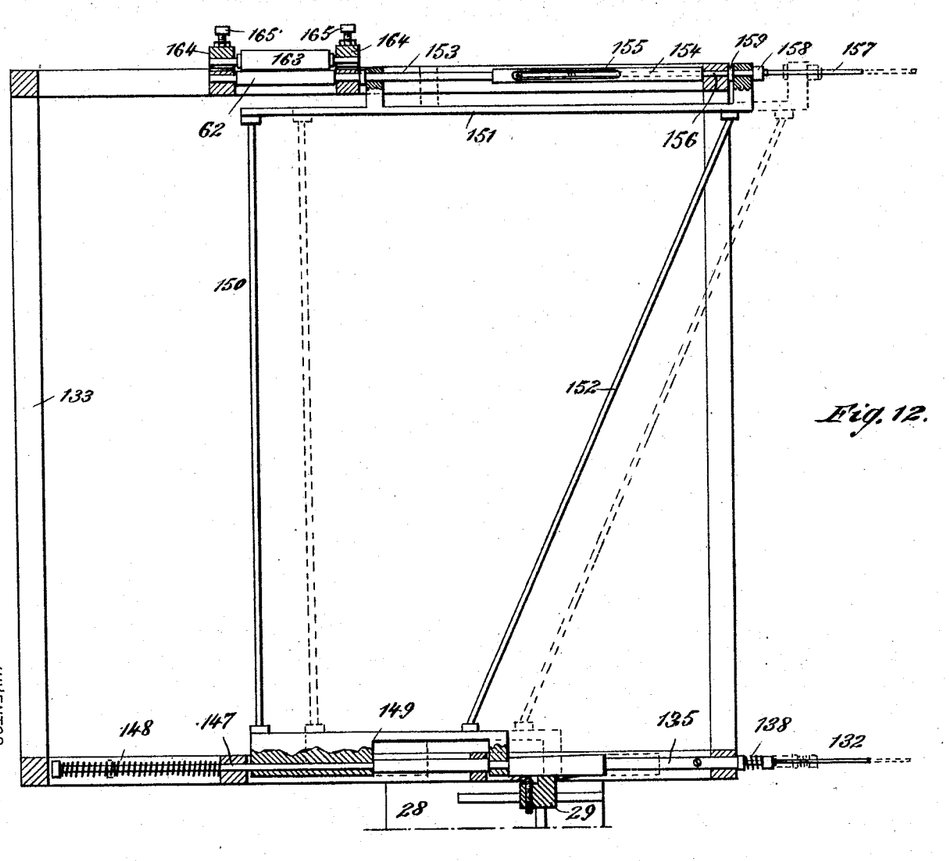
Fig. 12 is a detail view illustrating the connection between the guide-fingers and the drills or bits and the relative position of the reciprocating standard.
Figures 13, 14, 16, 17, 18, 19:
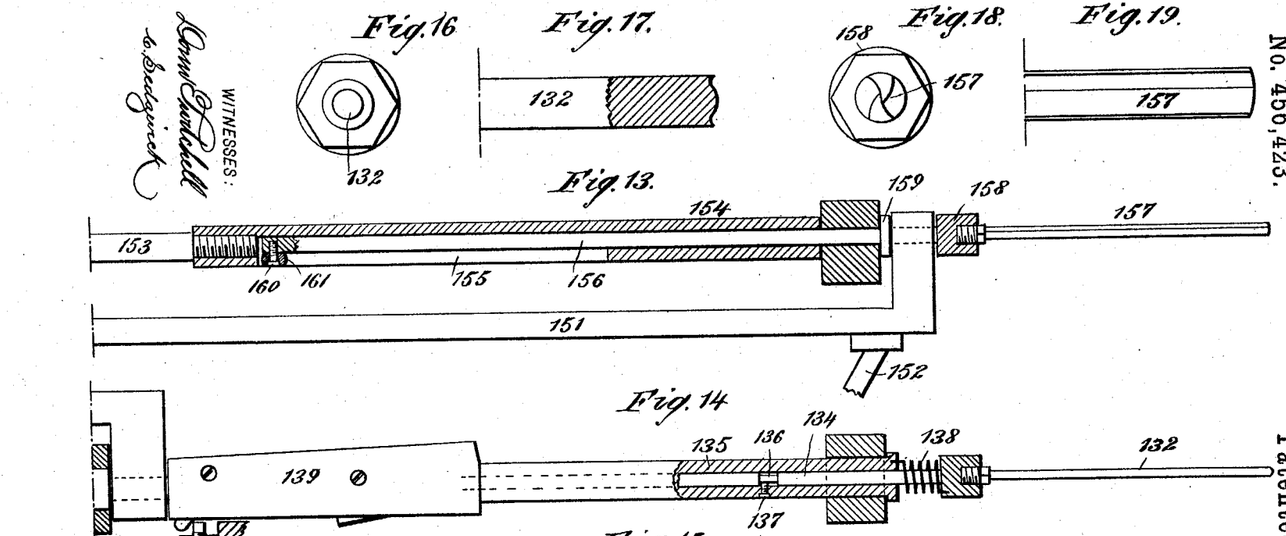
Fig. 13 is a plan view of one of the drills or bits and its connections, parts being shown in section, also fractional part of carrying-frame.
Fig. 14 is a plan view of one of the guide-fingers and its connections, parts being shown in section, also fractional part of carrying-frame.
Fig. 16 is an end view of one of the guide-fingers.
Fig. 17 is a side view of a portion of one of said fingers, the extreme end of the finger being shown in section.
Fig. 18 is a view of the operating end of one of the drills or bits.
Fig. 19 is a side view of the operating end of one of the drills or bits.

It will be understood that each one of the guide-fingers is held with the corresponding drill or bit upon the opposite side of the machine by a carrying-frame or connection, such as the one shown in Fig. 12.

Referring now to the construction illustrated in Fig. 15, it will be seen that if the extending end $m$ of the locking-lever 146 be forced inward the bearing-face $o$ of the pawl 143 will be thrown outward and into the line of travel of the forward edge of the upwardly-extending arm or standard 29 and held in such position by the catch 142; but it will also be seen that if the guide-finger 132 be forced inward against the tension of its spring 138 the toe 140, carried by the stem 134, will bear upon the lever 141, and such lever in turn will throw the trigger 142 from engagement with the shoulder $k$, thus leaving the spring 144 free to throw the pawl 143 inward against its stop or limit pin 145.

Figure 1:
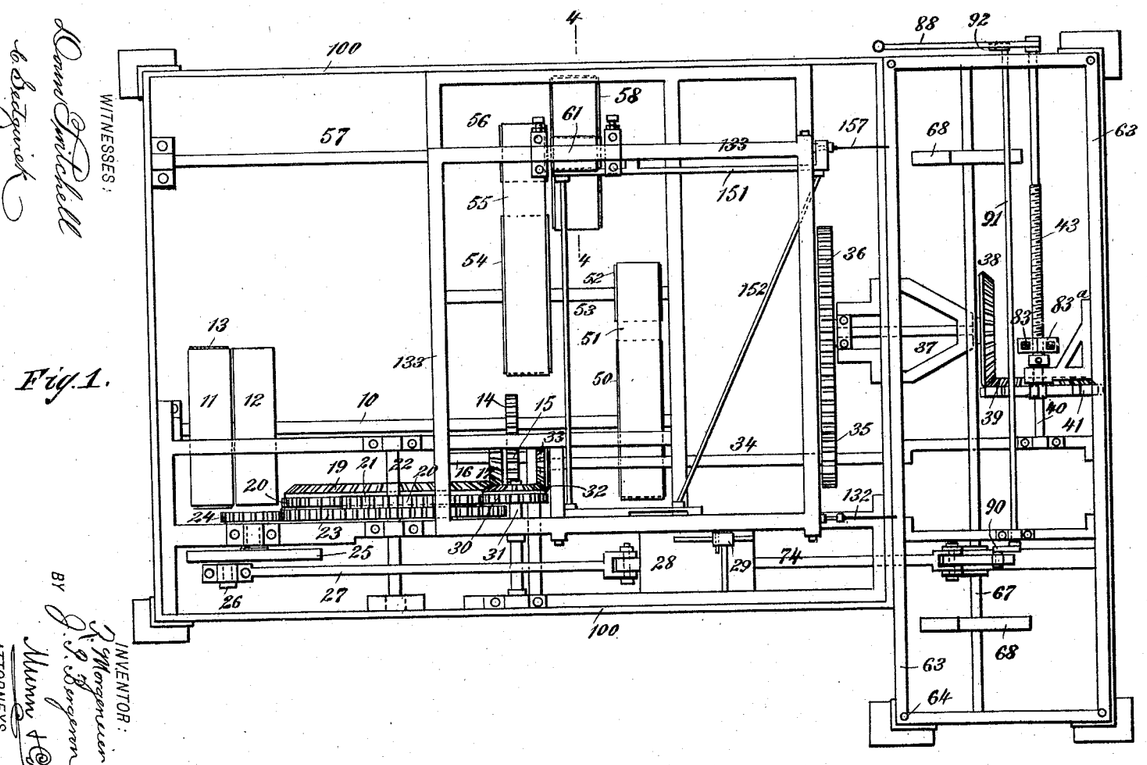
Figure 1 is a plan view of our improved duplicating-machine, the movable tables being removed.
Figure 2:
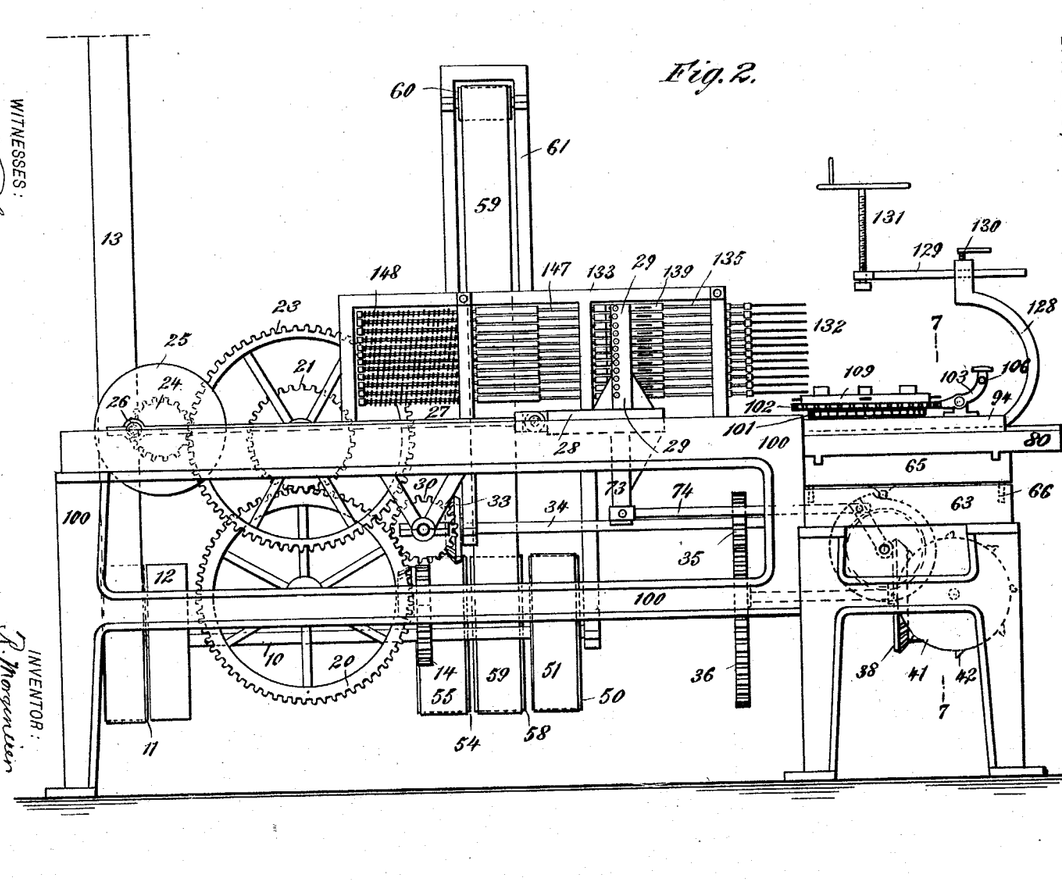
Fig. 2 is a right-side elevation of the machine, the chucks being shown in position.
Figure 3:
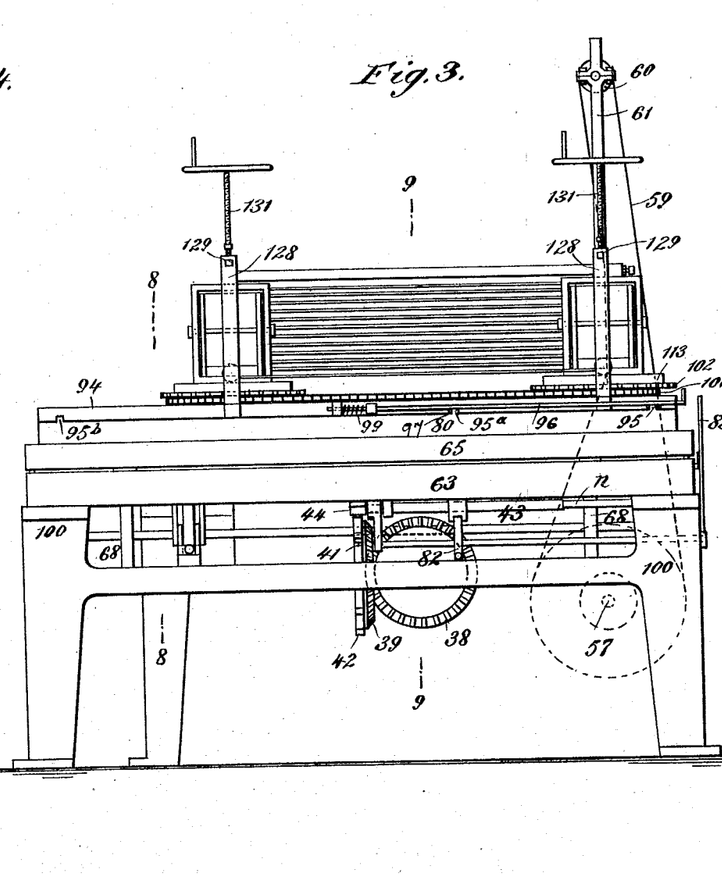
Fig. 3 is a front view of the machine, the panel and panel-pattern holders being shown in position.
Figure 4:
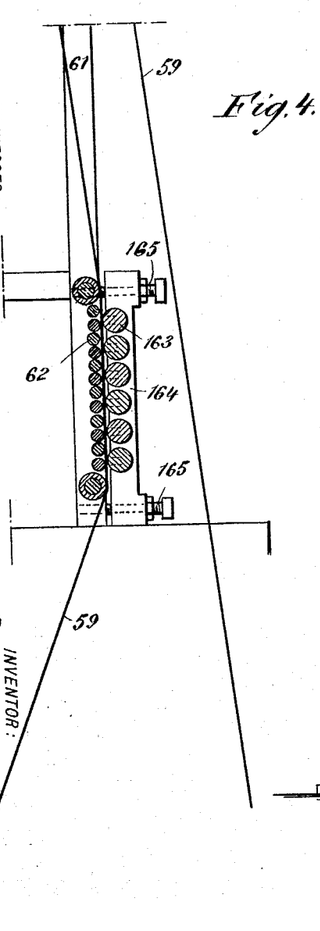
Fig. 4 is an enlarged sectional detail view on line 4 4 of Fig. 1.

When the pawls 143 are held outward by the trigger 142 in the position in which they are shown in Fig. 15, the forward edge of the independent reciprocating standard 29 will with its forward surface bear against the pawl-faces O, and with the forward motion of standard 29 the carrying-frame with the guide-fingers will be advanced simultaneously with the standard, and the stems 156, holding the drills or bits 157, will also be simultaneously drawn forward and partially out of their cases 154. Should no object arrest the advance of any one, all, or several of the guide-fingers, then the simultaneous forward motion of standard 29, carrying frames 147 to 149 151 152, guide-fingers 132 147, and drills or bits 156 to 157, will continue to advance the entire extent or distance of forward stroke of pitman 27, Fig. 1, and upon the completion of such stroke the parts referred to will all move back to the starting-point, the standard 29, while so moving backward, transferring the pressure from the pawl-faces O to the lever 146 at $m$ by its set-bolts 170, and preceding such backward pressure the force of the spiral spring 148 accumulated during the forward advance has set in. If, on the other hand, in the forward advance of the mechanism just described any one, several, or all of the guide-fingers should either simultaneously or at different periods in their forward advance encounter the face of a pattern held within the line of their centrical forward travel, such guide finger or fingers so encountered will be checked, while the remaining mechanism would still be advancing, the consequence of such checking of the guide-finger being that the case 135 will slide over its stem to the extent permitted by the limit-pin 137, thus virtually retracting the finger and its stem 134, such retraction operating by the toe 140 and the lever 141 on the trigger 142, whereupon the pawl 143 will be thrown within its housing by the spring 144 and out of the reach of the still advancing standard 29. Immediately when any guide-finger has broken the connection existing between the standard 29 and pawl 143 the carrying-frame and drill or bit with which it is connected are carried backward by the accumulated force of the spring 148, and such backward movement is completed upon the return of the standard 29 because of its pressure by way of the set-bolt 170 upon the lever projection $m$. While the office of spring 148 and bolt 170 is to return all of the frames, guide-fingers, and drills or bits, the bolt 170 has the further office of again throwing outward and within the reach of standard 29 the pawls 143 of all of those frames whose connection with the standard had become broken in the preceding advance, as heretofore described.

In order that the levers 146 may be operated upon as desired, we provide the arm or standard 29 with adjustable stops 170, such stops being arranged so that they may be turned forward into the path traveled by the lever projections $m$. Then if a pattern of small size is being operated upon and all of the cutters and guiding-fingers are not required those which are not required may be held out of use by turning back the stops 170, arranged in connection therewith.

In practice we would have several sizes of drills or bits, the coarser sizes being used for large work and the finer smaller sizes for more elaborate work.

The machine which we have hereinbefore described operates as follows: If a carved panel is to be reproduced, the pattern thereof is firmly fixed on the pattern-panel holder, which has been placed on the disk 102 in advance of the guide-finger 132. The material in which the pattern is to be duplicated is fixed in the same manner before the drills or bits, the parts being firmly clamped to place by the screws 131, care being taken that both the panel and the material are at the same angle horizontally and perpendicularly, which adjustment may readily be effected through the medium of the screw 121 and by moving the disks and locking them to place by their keys 103. Prior to the starting of the machine the lever 88 is depressed and the nut-sections 83 and 83ª thrown from engagement with the threaded sections of the shaft 43, and this movement of the lever will throw the pawl 71 from engagement with the ratchet 69 and permit the operator to move the table 80 to the end of its line of travel. The upper table 94, having been pushed back out of reach of the drills or bits, is then pushed backward until the left-hand end of the pattern and the material have just passed the line of travel of the drills or bits and guide-fingers. This point of stoppage will be determined by a set-nut, which is adjustably connected to the shaft 43. The upper table 94 is then returned to its working position and is there held by the projections 97, which, as before stated, extend downward from the rod 96 and engage the teeth of the racks 95 and 95ª. The lever 88 is then raised and the nut-sections 83 and 83ª brought into engagement with the screw-shaft 43, the pawl 71 being also brought into contact with its ratchet by this movement of the lever. When the parts have been arranged as described, the belt 13 may be shifted to the pulley 11, and the machine thus started. The projections 42 upon the periphery of disk 41 when acting on cam 44 impart a steady intermittent motion to the screw-shaft 43, which steadily advances the table 94, connected thereto by the nut 83 83ª, to the left at the rate of one-sixteenth of an inch for every intermittent motion of the screw, which screw is acted upon at a speed which will carry forward the table at the rate of one inch per minute. The ratchet-wheel 69 will be slightly turned and the cams 68 also turned, thus raising the table or frame 65 and the parts carried thereby, lateral and vertical step-by-step motion being continued until the left end portions of the material and pattern come within range of the guide-fingers and drills or bits. Simultaneously with the movement of the tables just described begins the reciprocating motion of the standard 29, carrying forward and backward the twelve or more carrying-frames locked thereto by their pawls and levers, each frame carrying its guide-finger and drawing forth or returning its drill or bit. It will be seen that with every forward and backward motion of the bed 28 there will be a corresponding backward and forward movement of the standard and frames carrying guide-finger and drill or bit. The descriptions and drawings show that this motion, as far as the standard is concerned, is regular, continued, and always of the same previously-adjusted extent as concerns distance. In the forward movement the drills or bits encountering material are forced into the same and cut after the manner of a hand-drill or bit, but with greater speed and precision. If the guide-finger does not touch its point against the pattern, the drill or bit will cut into the material to the full length of the forward travel of the standard 29, and the frame drawing it forward not becoming unlocked from the standard, such frame will follow the backward course of the moving power, drawing back such drill or bit. So long as the pattern is not within the reach of the guide-finger the carrying-frame will remain locked and reciprocate regularly with the standard 29. If the pattern and material have been placed properly, as heretofore described, and have, because of the motion of the table carrying them, passed within the line of travel of the guide-fingers and drills or bits, then the guide-fingers will encounter the face of the pattern with and upon every forward advance of their frames, carried forward by the standard 29. As soon as a guide-finger is checked in its advance by encountering a point of the pattern centrically opposite its line of forward travel and a slight pressure on the point of the finger ensues that particular guide-finger through its stem and toe will act upon its particular lock, tripping its particular pawl away from the standard 29, breaking all connection therewith, and allowing the particular frame so disconnected to be partially drawn back and away from the work by its spring 148. Upon the return of the standard its relocking is effected by the bolt 170 pressing upon the lever projection m, the bolt 170 performing the double office of completely carrying the frame back to its starting-point and throwing out the locking-pawl, as heretofore described. The action and motion just described reoccurs with each finger, frame, and drill or bit at each forward motion; but the point of advance whereat any particular drill or bit will cease to cut depends entirely upon the contour of the pattern which may at that particular time stand within the reach of its guide-finger. Thus the greatest projection upon the pattern will cause the guide finger or fingers opposite it to release their frames from the advancing standard first, the lesser projections later, and the deepest depression, calling for the deepest cut into the material on part of drill or bit, will naturally be the last surface encountered by any guide-finger opposite it. The twelve or more drills or bits revolved by the spindles 62 make as many incisions for each advance and effect these incisions at the rate of two per second. Therefore, when using an one-eighth-of-an-inch "designing" drill or bit the edges of these incisions will overlap at their upper and lower extremities, and upon a repetition of these incisions after an advance on the part of the table one-sixteenth of an inch there will be a complete overlapping of one-sixteenth of an inch, and this overlapping of the incisions will continue during the operation of the machine. When the table has advanced to a point where the right end of the pattern and the material have passed beyond the line of guide-points and cutter-blades, the first division of the work is complete and the duplicate is in the "rough." The nut-sections 83 and 83ª are then disengaged from the screw-shaft 43, although should the nut-sections (because of any inattention on the part of the operator) not be disengaged at the proper time they will be carried forward to that part of the screw (shown at $n$) where the thread has been cut away, and consequently the table will cease its forward movement. The upper table is then pushed out of range of the drills or bits and the panel-holders are turned through the medium of their cranks 126 to such an extent as to form a decided angle, if necessary, of seventy degrees, and the revolving chucks are turned to the left until both panel and pattern holders are at an angle to the plane in which they formerly rested. The table is then brought back to its starting-point within range of the drills or bits and guide-fingers. The nut-sections 83 and 83ª are brought into engagement with their shaft 43 and the table allowed to travel forward a second time. Although the drills or bits and guide-fingers are in the same position as upon the first line of travel, it will be seen that the backward slope has not only presented an entirely new surface to the operation of the drills or bits, but has virtually contracted the field upon which they operate, thereby effecting several important ends, viz: The backward slope permits of an undercutting of the design and a more complete overlapping of the surface already worked upon, and it also permits the entering of the drills or bits at a more acute angle, thus removing any burrs or incorrect projections which may have been left after the first action of the drills or bits upon the material. After the second operation the panel is passed through a third time, except that the vertical and horizontal angles given to the pattern and material are reversed. The result of this third and final operation is to thoroughly dress the surface of the material and to duplicate as well as to overcut and undercut the material, thus producing an accurate duplicate of the pattern or model.

For work of very elaborate and minute intricate detail a much-smaller-sized drill or bit may be substituted for the ones originally employed, and the operations above described may be repeated.

When duplicating a pattern which requires cutting on all sides, the panel-holders are removed and the chucks 109 are substituted, the pattern and the material being firmly fastened above the centers of the chucks.

After every passage of the material and the pattern beyond the perpendicular series of guide-fingers and drills or bits, model and material are turned to the right or left until all sides of the pattern have been submitted to the action of the guide-fingers, whereupon the "duplicate" will be formed.

When using large tools for the purpose of covering greater space in shorter time, which may be feasible in work of large design and proportions, an increase of speed in the rising of the table 65 and the transverse motion of the table 80 is brought about by throwing the shield 75 backward, so as to leave a greater number of the teeth of the ratchet exposed, and by adding a number of projections 42 to the disk 41.

It will of course be understood that the "time" of the machine could be varied to suit the ideas of the builder; but we find the time hereinbefore set forth well adapted to the work in hand.

Having thus described our invention, we claim as new and desire to secure by Letters Patent—

1. In a duplicating-machine, the combination of vertically and horizontally movable pattern and material holders, and a reciprocating guide-finger and drill or bit, substantially as described.

2. In a duplicating-machine, the combination of vertically and horizontally movable pattern and material holders, a reciprocating guide-finger, and a reciprocating and rotary bit or drill, substantially as described.

3. In a duplicating-machine, the combination of a reciprocating frame, a guide-finger, and a continuously-rotating bit or drill, said guide-finger and drill or bit being carried by the reciprocating frame, substantially as described.

4. In a duplicating-machine, the combination, with a reciprocating frame, of a guide-finger mounted therein and having a movement independent of the movement of the said frame, substantially as and for the purpose set forth.

5. In a duplicating-machine, the combination, with a reciprocating frame and a guide-finger carried by said frame, of mechanism for arresting the movement of the frame when the guide-finger encounters the face of the pattern, substantially as described.

6. In a duplicating-machine, the combination, with a reciprocating frame and a guide-finger carried thereby, of mechanism for arresting the movement of the frame when the guide-finger encounters the face of the pattern, and means for imparting a slight backward movement to the said frame when arrested, substantially as described.

7. In a duplicating-machine, the combination, with a reciprocating guide-finger, of a spring for retracting the finger, and a tripping device operated by the finger to disengage it from the advancing mechanism, substantially as described.

8. In a duplicating-machine, the combination, with a frame and a guide-finger and drill or bit carried thereby, of a reciprocating mechanism for operating said frame, and a releasing mechanism operated by the guide-finger when it encounters the face of the pattern to release the reciprocating mechanism from the frame, substantially as described.

9. In a duplicating-machine, the combination, with a frame and a guide-finger and drill or bit carried thereby, of a reciprocating mechanism for operating the frame, a releasing mechanism operated by the guide-finger when it encounters the face of the pattern to release the frame from the reciprocating mechanism, and a spring for imparting a slight backward movement to the frame when released from the reciprocating mechanism, substantially as described.

10. In a duplicating-machine, the combination, with a frame and a guide-finger and drill or bit carried thereby, of a reciprocating bed, a pawl carried by the frame and adapted to be engaged by the reciprocating bed, and a tripping mechanism operated by the guide-finger for disengaging the pawl from the said reciprocating bed, substantially as described.

11. In a duplicating-machine, the combination, with a frame and a guide-finger and a drill or bit carried thereby, of a reciprocating bed, a pawl carried by the frame and adapted to be engaged by the reciprocating bed, a tripping mechanism operated by the guide-finger to disengage the pawl from the reciprocating bed, and a spring for imparting a slight backward movement to the frame when its pawl is disengaged from the reciprocating bed, substantially as herein shown and described.

12. The combination, with a guide-finger, of a pawl, a means for throwing out the pawl, and a pawl-tripping mechanism operated by the guide-finger, substantially as described.

13. The combination, with a guide-finger and its stem, of a case, a spring arranged in connection with the case and stem, a housing, a stem extending to the rear from the housing, a second spring arranged in connection with the housing-stem, a pawl arranged within the housing, and a pawl-tripping mechanism, substantially as described.

14. The combination, with a guide-finger and its stem, of a case, a spring arranged in connection with the case and stem, a housing, a pawl mounted therein, a spring arranged in connection with the pawl, a spring-pressed trigger, a lever arranged in connection therewith, a toe carried by the finger-stem and arranged to bear upon the lever, a lever 146, arranged to engage the pawl and formed with an outwardly-extending projection, a stem extending to the rear from the housing, and a spring arranged in connection with the stem, substantially as described.

15. The combination, with a series of reciprocating guide-fingers and tripping mechanisms arranged in connection with the guide-fingers, of revoluble cutters, a means for revolving the same, and a connection between the cutters and guide-fingers, substantially as described.

16. The combination of a pair of disks adapted to receive holders for the material to be operated upon and the pattern, respectively, and means for simultaneously rotating said disks, substantially as described.

17. The combination of a pair of vertically and horizontally movable disks adapted to receive material and pattern holders, means for simultaneously rotating the said disks, and locking-catches for said disks, substantially as described.

18. A duplicating-machine provided with rotating and transversely-moving material and pattern holding disks, substantially as described.

19. A duplication-machine provided with a pair of vertically, longitudinally, and horizontally moving and simultaneously-rotating material and pattern holding disks, substantially as described.

20. The combination of disks adapted to receive material and pattern holders, chain-wheels carried by the disks, and a chain passing around said wheels, substantially as described.

21. The combination, with a pair of disks adapted to receive material and pattern holders, of chain-wheels carried by said disks, a chain arranged in connection with said wheels, and a means for locking the disks, substantially as described.

22. The combination, with a pair of disks formed with notched peripheral edges and adapted to receive pattern and material holders, of chain-wheels arranged in connection with the disks, a chain which engages said wheels, locking-catches 103, arranged to engage the disks, and rods by which the catches are connected, substantially as described.

23. The combination, with a pair of disks adapted to receive material and pattern holders, of a means for simultaneously revolving the disks, and clamping-screws 131, arranged above the disks, substantially as described.

24. The combination, with a shaft 67 and a means for advancing the same, of cams carried by said shaft, a table or frame mounted above the cams and provided with guiding-pins, and anti-friction rolls carried by the table or frame which bear upon the cams, whereby upon the turning of the shaft the table or frame will be raised, substantially as described.

25. The combination, with a threaded shaft and a means for advancing the same, of a table, arms extending downward therefrom, and nut-sections carried by the arms and arranged to engage the shaft, whereby when the shaft is turned the table or frame will be moved laterally.

26. The combination, with a table or frame mounted to slide in ways, of pivotally-mounted arms which extend downward from the table or frame, nut-sections carried by the arms, a threaded shaft which is engaged by the nut-sections, a means for turning the shaft, and a device for separating the nut-sections, substantially as described.

27. The combination, with a table or frame mounted to slide in ways, of arms hinged thereto and extending downward therefrom, nut-sections mounted to slide upon the arms, a threaded shaft that is engaged by said sections, a means for revolving the shaft, a headed bar which extends through the lower ends of the arms, springs arranged in connection with the bar and arms, a cam held between the lower ends of the arms, and a means for turning the cam, substantially as described.

28. The combination, with a series of guide-fingers, of a rotary series of cutters controlled thereby, vertically and transversely movable disks arranged in advance of the fingers and cutters, and means for revolving the said disks, substantially as described.

29. The combination, with a ratchet, of pivoted arms, a pawl carried thereby and engaging the ratchet, a means for reciprocating the arms, and a guard or shield arranged to overlap a portion of the ratchet-teeth.

30. The combination, with a ratchet, of pivoted arms mounted in connection therewith, a pawl carried by the arms and engaging the ratchet, a means for reciprocating the arms, a guard or shield arranged to overlap a portion of the ratchet-teeth, and a means for adjusting the guard or shield.

31. The combination, with a ratchet, of reciprocating arms arranged in connection therewith, a pawl carried by the arms and engaging the ratchet, and means for disengaging the pawl from the ratchet, substantially as described.

32. The combination, with a ratchet, of pivoted arms arranged in connection therewith, a means for reciprocating the arms, a pawl carried by the arms and arranged to engage the ratchet-teeth, a projection 89, carried by the pawl, a means for throwing the projection downward, a guard or shield arranged in connection with the ratchet, and a retaining-pawl, substantially as described.

33. The combination, with a series of cutters or drills, of spindles to which the cutters are connected, and a belt running in contact with the spindles.

34. The combination, with a series of cutters or drills, of spindles to which the cutters are connected, a belt running in contact with the spindles, and a series of belt-tightening rollers, substantially as described.

35. The combination, with a base-plate, of a frame 114 carried thereby, a frame 115, carried by the frame 114, and a means for tilting the frame 115.

36. The combination, with a base-plate, of a frame 114 carried thereby, a frame 115, carried by the frame 114, and an adjusting-screw 121, that is arranged to engage the frame 115, substantially as described.

37. The combination, with the base-plates 113, of frames 114 carried thereby, frames 115, carried by the frames 114, adjusting-screws 121, arranged in connection with the frames 115, cranks formed upon the screw-shafts, and connections between the cranks, substantially as described.

38. The combination, with a series of guide-fingers, of a series of cutters connected thereto, a set of pawls arranged in connection with the guide-fingers, an arm or standard 29, arranged to engage the pawls, and a means for reciprocating the arm or standard to bring it into engagement with one of the pawls, substantially as described.

39. The combination, with a series of guide-fingers, of a series of cutters connected thereto, a set of pawls arranged in connection with the guide-fingers, a tripping-lever formed with an outwardly-extending projection, which lever is arranged in connection with the pawls, an arm or standard 29, arranged to engage the pawls, a means for reciprocating the arm or standard to bring it into engagement with one of the pawls, and stops or projections 170 carried by the standard, substantially as described.

40. The combination, with a series of guide-fingers, of a series of cutters connected thereto, a set of pawls arranged in connection with the guide-fingers, tripping-levers arranged in connection with the pawls and formed with outwardly-extending projections $m$, an arm or standard 29, adapted to engage one of the pawls, a means for reciprocating the same, and adjustable stops carried by said arm or standard and adapted to engage the projections $m$.

41. The combination of adjustable and revolving panel and pattern holders, a series of reciprocating guide-fingers, a series of cutters, connections between the guide-fingers and cutters, and means for reciprocating the guide-fingers and cutters and rotating the cutters, substantially as described.

ROBERT MORGENEIER.
JASMIN PIERRE BERGERON.

Witnesses:
W. A. FINKELNBURG,
J. V. MOTT.